April 29, 1924.
A. C. FRAZELL
BEET HARVESTER
Filed Oct. 27, 1921
1,492,444
4 Sheets-Sheet 2
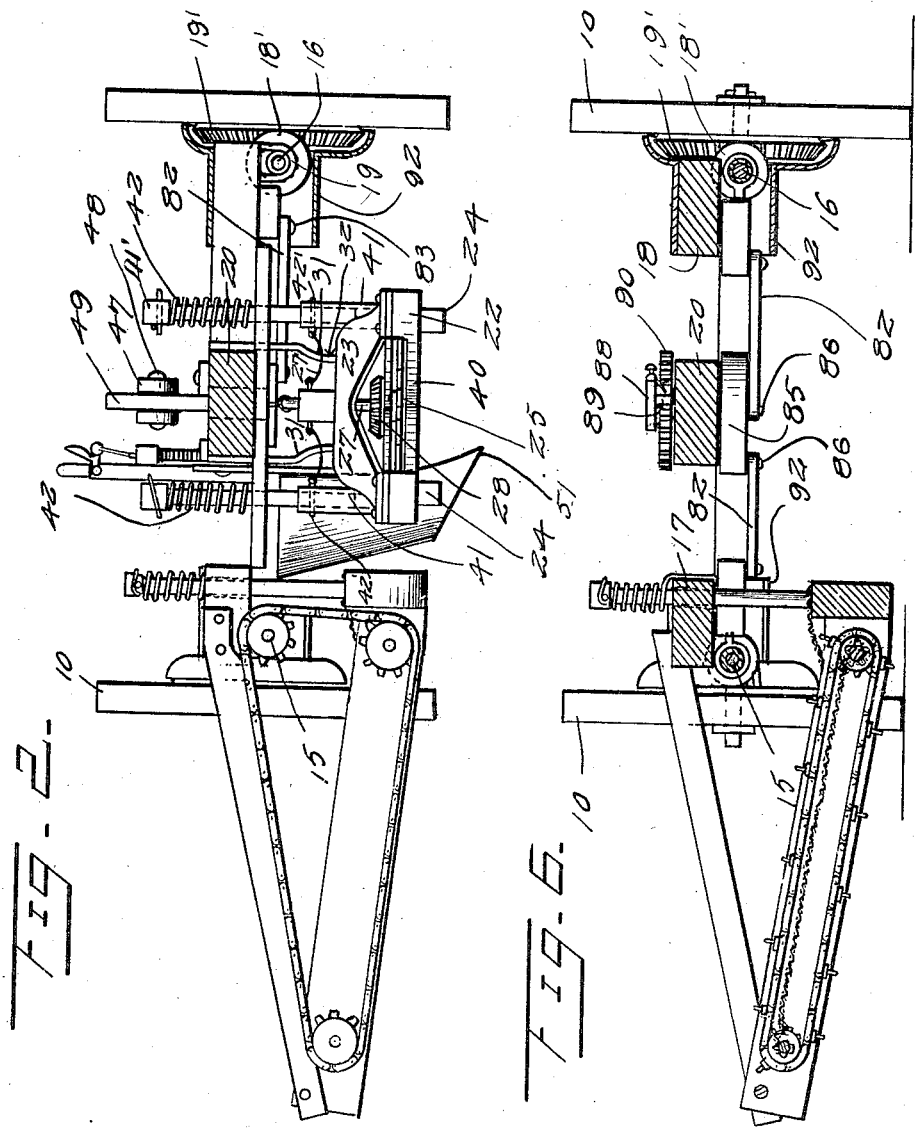

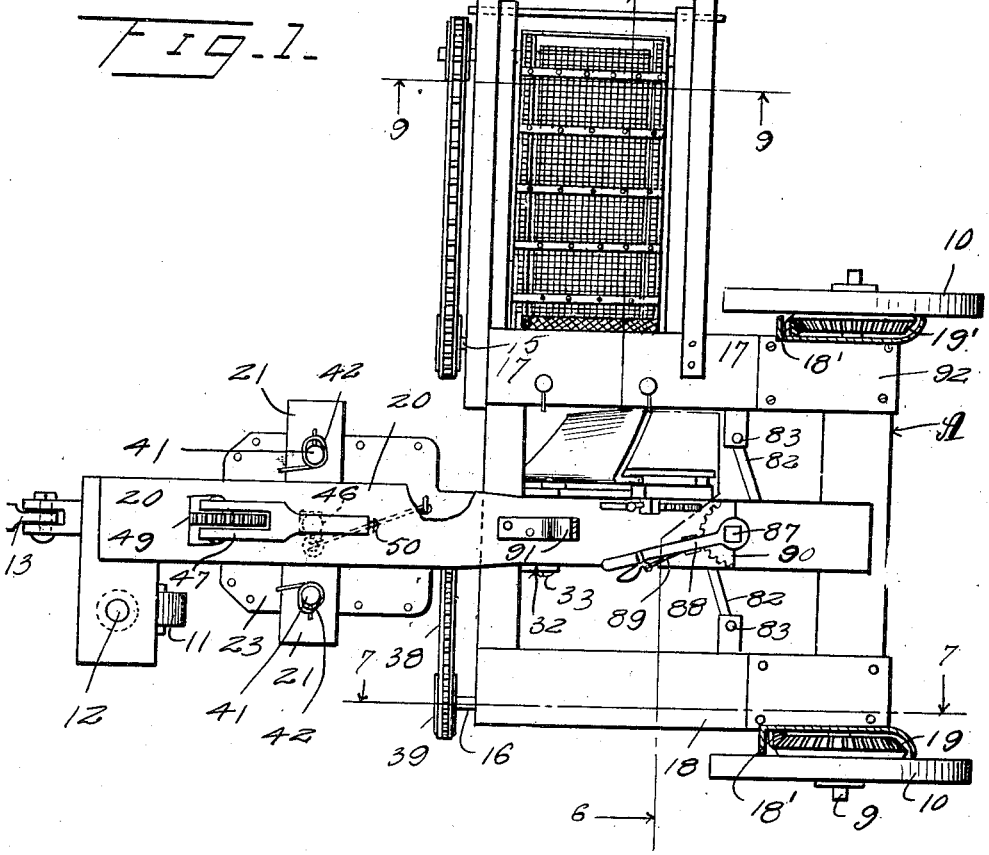

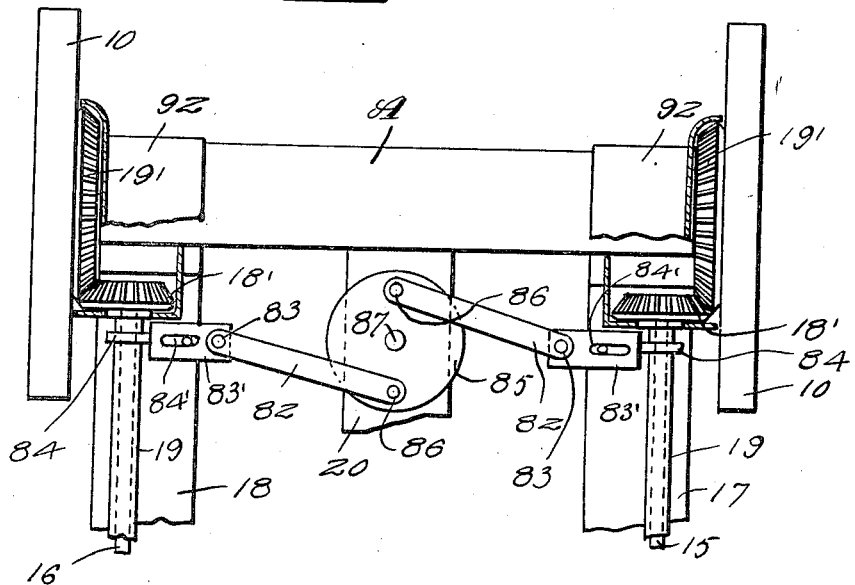
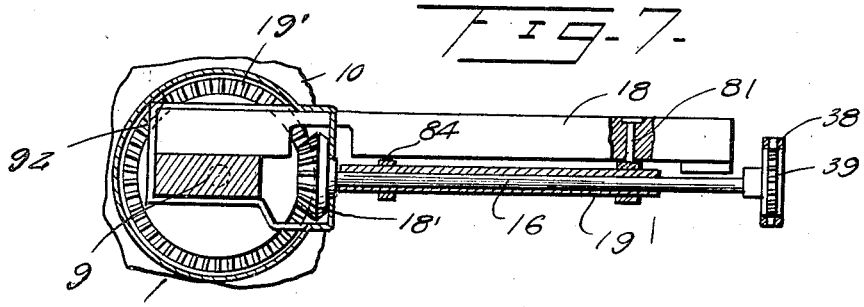
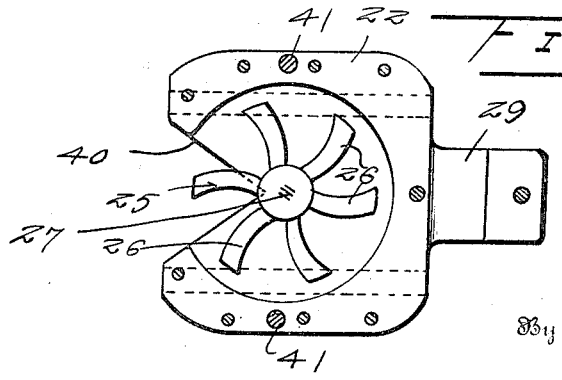

April 29, 1924.
A. C. FRAZELL
BEET HARVESTER
Filed Oct. 27, 1921
1,492,444
4 Sheets-Sheet 4
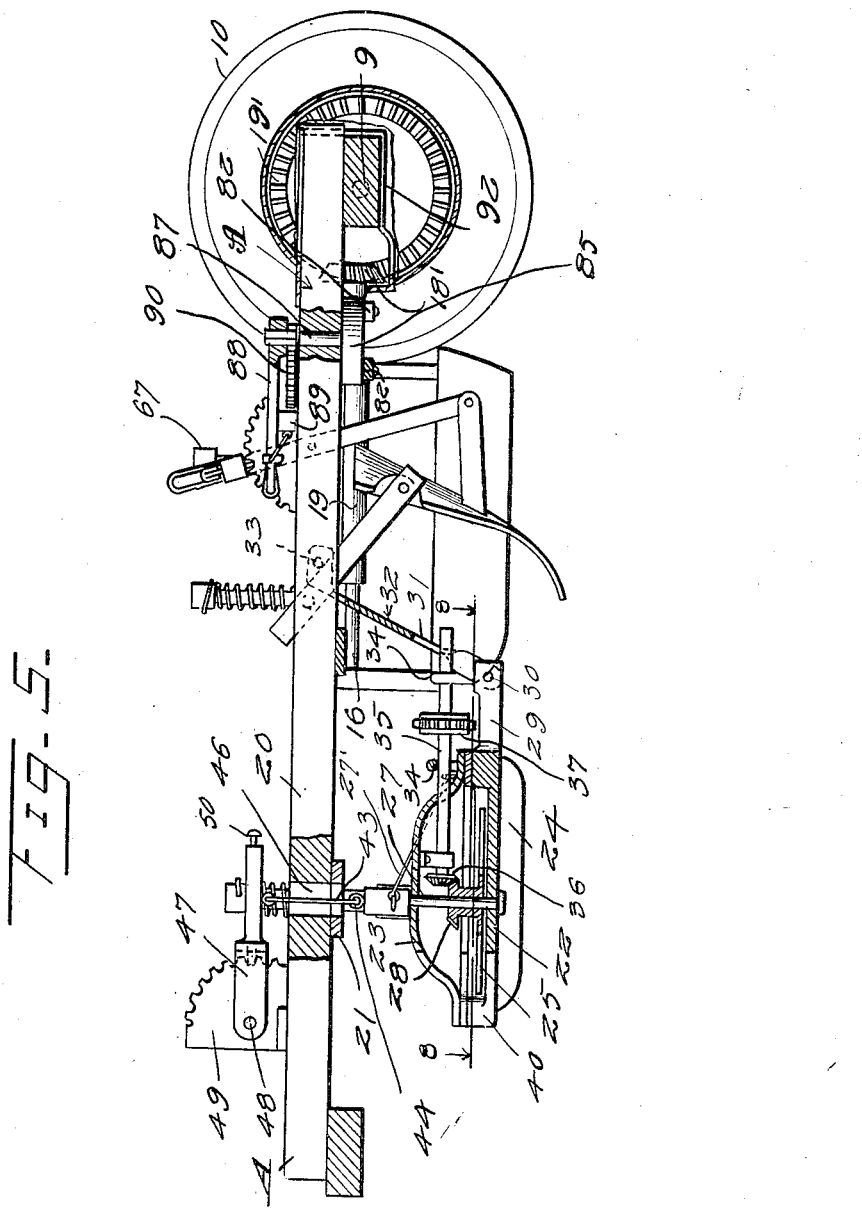
Inventor
A.C.Frazell
By 
Attorney Patented Apr. 29, 1924.

1,492,444

UNITED STATES PATENT OFFICE.

ALFRED C. FRAZELL, OF BOSTON, MASSACHUSETTS.

BEET HARVESTER.

Application filed October 27, 1921. Serial No. 510,720.

*To all whom it may concern:*

Be it known that I, ALFRED C. FRAZELL, a citizen of the United States, residing at Boston, in the county of Suffolk and State of Massachusetts, have invented certain new and useful Improvements in Beet Harvesters; and I do hereby declare the following to be a full, clear, and exact description of the invention, such as will enable others skilled in the art to which it appertains to make and use the same.

This invention relates to a beet harvesting machine.

An important object is to generally improve and render a machine of this type more efficient, particularly by the provision of novel means for topping the beets.

The invention resides in the combination and arrangement of parts hereinafter described with relation to accompanying drawings illustrating one practical embodiment which will be hereinafter described in detail and then claimed.

In said drawings:—

Figure 1 is a plan view;

Figure 2 is a front elevation with the front wheel removed to disclose details;

Figure 3 is a side elevation;

Figure 4 is a fragmentary bottom plan view;

Figure 5 is a longitudinal sectional view showing the topping mechanism;

Figure 6 is a transverse sectional view on the line 6—6 of Figure 1;

Figure 7 is a longitudinal sectional view on the line 7—7 of Figure 1;

Figure 8 is a horizontal sectional view on the line 8—8 of Figure 5.

Referring specifically to the drawings, wherein like reference characters designate like or similar parts, a suitable frame or chassis generally designated A is provided to support the operating parts. On a rear axle 9, ground wheels 10 are journaled. At the front and offset to one side of the median line of the machine, is a third ground engaging wheel. This wheel is designated 11 and is adapted to swivel from a vertical pivot 12 to facilitate guiding of the machine. Any suitable draft means may be utilized such as a tractor, or animal power, or an engine thereon, but as shown, a hitching means 13 is provided for draft animals.

The effective mechanism of my machine is driven primarily from shafts longitudinally disposed, and one at each side of the machine, as at 15 and 16. These shafts may be under hung from beams of the chassis 17 and 18 and journaled in bearing sleeves 19. In order to drive the shafts 15 and 16, beveled gear wheels 18' may be keyed thereto and meshed with bevel gear wheels 19' rigidly secured to the ground wheels 10. Thus through the medium of the gearing mentioned, as the ground wheels 10 travel, they impart rotary motion to the shafts 15 and 16.

Said chassis A includes a longitudinal centrally disposed beam 20. Secured to the beam 20 and transversely disposed to project beyond opposite sides thereof is a bar 21. Below the bar 21 a suitable casing is provided preferably in sections 22 and 23. Depending from the section 22 are runners 24 which engage the ground. Intermediate the sections 22 and 23 a knife is disposed at 25 preferably having a plurality of cutting blades 26. Said knife 25 is journaled on a stub shaft 27. Rigid with the knife 25 is a bevel gear wheel 28 which is also journaled on the stub shaft 27. Knife 25 and gear wheels 28 thus substantially form an integer. At the rear, section 22 has an extension 29 to which are fastened as at 30 bifurcated arms 31 of a hanger 32 secured at 33 to the longitudinal beam 20. Journaled in suitable bearings 34 on the section 23 and extending into the casing, is a shaft 35 which has a bevel gear wheel 36 keyed thereto and meshing with said bevel gear wheel 28. Exteriorly of the casing, a sprocket wheel 37 is keyed to the shaft 35 and a sprocket chain 38 is trained thereover and also over a sprocket wheel 39 keyed to the shaft 16. Thus it will be seen that through rotation of shaft 16, the gearing described will impart rotary movement to the knife 25 so that it will rotate in a horizontal plane, and relatively close to the ground. Said knife 25 is adapted to cut the leaves from the beets or top them and to this end, sections 22 and 23 of the casing are preferably cut away as at 40 to form a means to guide the leaves of the beet to the knife 25 in the best position for severance.

Sleeves 41 rise from the section 22 on opposite sides of the beam 20 and slidably receive the lower ends of posts 41' which pass through and above the bar 21. The sleeves and posts are connected together against relative movements by removable pins 42' which pass through the sleeves and posts.

Surrounding the posts 41' are coil springs 42 which urge the posts downwardly so as to maintain the runners 24 in contact with the ground regardless of the unevenness of the surface and to this end, one terminal of each spring is secured to the post 41' and the other terminal is secured to the bar 21. When the pins 42' are removed the sleeves 41 are free to slide vertically upon the posts 41'. To prevent the loss of the pins 42', they are connected to the stub shaft 27 by flexible elements 27'.

In order to elevate the knife 25 and its casing, when the machine is traveling to and from the field, a cable 43 is connected to the stub shaft 27 at 44. Cable 43 also passes through an opening 46 in the beam 20 and connects to a lever 47. Lever 47 is pivoted at 48 to a toothed segment 49 mounted on the beam 20. A suitable locking device or plunger 50 is carried by the lever 47 to engage notches in segment 49 in order to secure the lever 47 and the knife and its casing in adjusted position.

As it is desirable to have the shafts 15 and 16 inactive at times, as for instance when traveling to and from a field, suitable means are provided whereby the gears 18' and 19' may be disengaged when desired. To this end, the bearing sleeves 19 are pivoted at their forward ends to the beams 17 and 18, as at 81, and suitable links 82 are pivoted as at 83 to slide blocks 83', which are connected to the bearing sleeves 19 as at 84 and to the beams 17 and 18 as at 84'. The links 82 are pivoted to a disk 85 as at 86. Disk 85 is disposed against the undersurface of the beam 20 and a stub shaft 87 rises therefrom and is suitably journaled in said beam. Above beam 20, a lever 88 is secured to the stub shaft 87 and is adapted to be secured in its different positions by a locking plunger or means 89, engageable with a toothed segment 90 mounted on the beam 20. It will thus be seen, that through movement of the lever 88, pivotal movement is imparted to the bearing sleeves 19 to move the gears 18', into or out of mesh with the gears 19' as desired.

A driver's seat 91 may be provided at any suitable location on the beam 20, as for instance in the position shown. In said position, lever 88 may be grasped by the driver for manipulation.

To exclude dust and foreign matter from the gears 18' and 19', suitable casings or housings 92 are provided.

As the machine progresses over a beet field, the knife 25 engages the tops of the beets and effectively severs them leaving the tops or leaves in the path of travel. Due to the provision of the springs associated with the posts 41' the cutting mechanism may yield vertically according to uneven ground conditions. It is clear of course as set forth specifically heretofore, that the shaft 16 driven by one of the ground wheels, imparts motion to the cutting mechanism.

Changes in the details may be resorted to.

I claim as my invention:—

1. A harvesting machine having a casing, said casing having a section to travel on the ground, a shaft journaled on said section, a cover section through which said shaft passes, a stub shaft journaled at an angle to said shaft, a cutter journaled on the stub shaft, a gear wheel on the first mentioned shaft, a gear wheel rigid with said cutter in mesh with said gear wheel, means to mount said section and driving means for the first mentioned shaft.

2. A harvesting machine having a casing, said casing having a section to travel on the ground, a shaft journaled on said section, a cover section through which said shaft passes, a stub shaft journaled at an angle to said shaft, a cutter journaled on said stub shaft, a gear wheel on the first mentioned shaft, a gear wheel rigid with said cutter in mesh with said gear wheel, posts rising from said casing, a bar in which said posts are slidably disposed, springs surrounding said posts secured to the posts and to the bar, and a driving connection for the first mentioned shaft.

3. A harvesting machine having a cutting mechanism including a casing, a driving shaft for said mechanism, said casing having a section provided with an extension, a hanger engageable with said extension, and driving means for said shaft engageable therewith intermediate said hanger and the section proper.

In testimony whereof I affix my signature in presence of two witnesses.

ALFRED C. FRAZELL.

Witnesses:
JOHN H. GARDNER,
WILLIAM DUSTON.